United States Patent [19]

Paredes et al.

[11] 4,347,563
[45] Aug. 31, 1982

[54] INDUSTRIAL CONTROL SYSTEM

[75] Inventors: Candelario Paredes, Dallas; Billy R. Slater, Plano, both of Tex.

[73] Assignee: Forney Engineering Company, Carrollton, Tex.

[21] Appl. No.: 159,597

[22] Filed: Jun. 16, 1980

[51] Int. Cl.³ .................. G06F 15/46; G06F 11/00
[52] U.S. Cl. .................................. 364/137; 364/133; 371/9; 371/11
[58] Field of Search ............... 371/8, 9, 11; 364/101, 364/102, 103, 119

[56] References Cited

U.S. PATENT DOCUMENTS

| 3,377,623 | 4/1968 | Reut et al. | 371/9 X |
|---|---|---|---|
| 3,636,331 | 1/1972 | Amrehn | 371/9 X |
| 3,786,433 | 1/1974 | Notley et al. | 371/9 X |
| 3,964,055 | 6/1976 | Carruet et al. | 371/9 X |
| 4,099,241 | 7/1978 | Ossfeldt | 371/9 X |
| 4,133,027 | 1/1979 | Hogan | 364/119 |
| 4,141,066 | 2/1979 | Keiles | 364/119 |

Primary Examiner—Joseph F. Ruggiero
Attorney, Agent, or Firm—Marvin A. Naigur; John E. Wilson; Warren B. Kice

[57] ABSTRACT

In an industrial control system, a plurality of remote data processing units communicate with one another over a communications link. Some of the processing units called primary remotes have inputs and outputs and control a process operation in response to signals received on the inputs by signals transmitted over the outputs. One or more of the remote processing units, referred to as a redundant remote, monitors a plurality of the other primary remotes to determine whether any of the monitored primary remotes has failed. If any of the primary remotes fails, the redundant remote takes over operation of the process controlled by the failed primary remote by sending instructions and commands over the communications link interconnecting the primary and redundant remotes.

7 Claims, 13 Drawing Figures

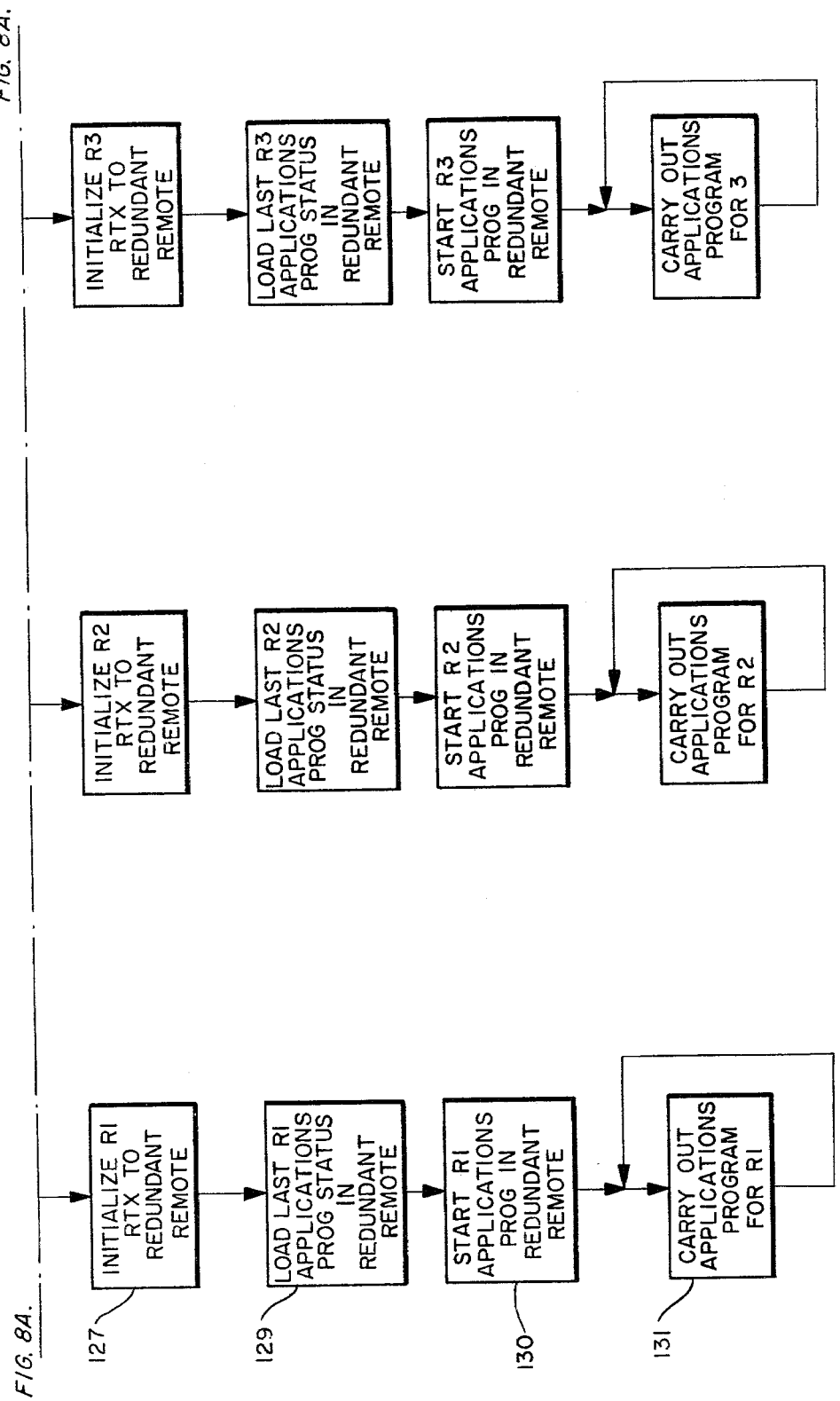

INDUSTRIAL CONTROL SYSTEM

BACKGROUND OF THE INVENTION

The present invention relates to control systems of the type having a plurality of remotely located process control units connected together through a communications link and, more particularly, to a control system in which one or more redundant control units each serve as a back-up for a plurality of the remotely located process control units.

Many system type industrial installations, for example, those related to industrial process-type manufacturing and electrical power generation, employ a large number of physically distributed controlled-devices and associated sensors for effecting coordinated operation of the overall system. In the past, coordinated control of the various devices has been achieved by manual operation and various types of semi-automatic and automatic control systems including electromagnetic relay systems, hardwired solid-state logic systems, and various types of computer control systems. The computer systems have included central systems in which the various sensors and controlled devices are connected to a central computer; distributed control systems in which a remotely located computer is connected to each of the controlled devices and to one another, and hybrid combinations of the central and distributed systems. The successful functioning of the control system is vital to any industrial process, and, accordingly, distributed systems have generally been preferred over central systems because the failure of one of the remotely located control computers generally does not cause a system wide failure as in the case of the failure of the central computer in the central system. In copending application Ser. No. 115,161, filed Jan. 14, 1980, invented by Michael E. Cope and assigned to the assignee of this application, there is disclosed a distributed control system. The preferred embodiment of the present invention is employed in a distributed control system as disclosed in this copending application.

In the control system disclosed in application Ser. No. 115,161, U.S. Pat. No. 4,304,001, a plurality of remote process control units $R_n$ (remotes) are connected to various controlled devices and sensors and communicating with one another through a communications link, which transmits data serially. Each remote is assigned a unique succession number or position in a predetermined succession order with each remote unit assuming supervisory communication control of the communications link on a revolving or master for the moment basis in accordance with the remote's relative position in the succession order. Information transfer including process data and command control information is accomplished between a source remote $R_s$ and a destination remote $R_d$ by successively transmitting information blocks over the communications link with the destination remote $R_d$ testing the validity of the blocks and, if valid, responding with an acknowledgement signal (ACK), and, if invalid, a non-acknowledgement signal (NAK) is sent by the destination remote $R_d$. The source remote $R_s$ will retransmit the information blocks in response to a non-acknowledgement signal from a destination remote.

In accordance with the present invention, one or more of the remotes connected to the communications link is a redundant remote. Each redundant remote is designed to monitor a plurality of other remotes which are referred to as primary remotes and each of which may perform active control operations. The redundant remote detects whether or not any one of the primary remotes has failed and if it has failed, it then will take over operation of the inputs and outputs of that remote by sending instructions or commands over the communications link to the failed remote.

BRIEF DESCRIPTION OF THE DRAWINGS

The above description, as well as the objects, features, and advantages of the present invention will be more fully appreciated by reference to the following detailed description of a preferred embodiment in accordance with the present invention when taken in connection with the accompanying drawings wherein:

FIGS. 8A and 8B are flow diagrams of the program employed in the central processing unit of the redundant remote R4 illustrating how the redundant remote R4 monitors the operating condition of primary members R1, R2, and R3 and takes over operation when one of the primary remotes fails.

DESCRIPTION OF THE PREFERRED EMBODIMENT

Figure 1:
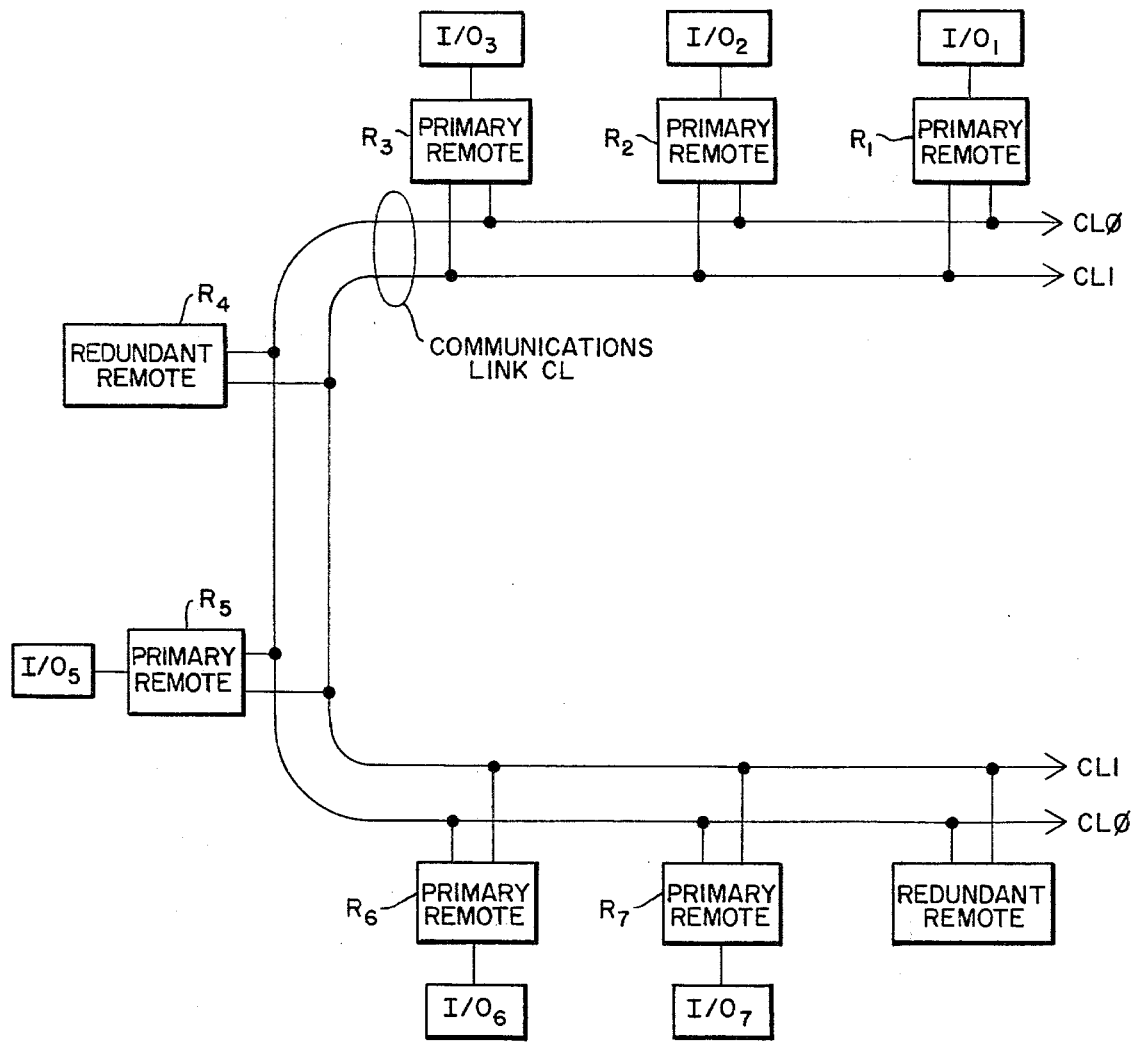
FIG. 1 is a schematic diagram of an exemplary process control system of the invention including a plurality of remote process control units (remotes) connected to a common, dual-channel communications link.

An industrial control system in accordance with the present invention is shown in schematic form in FIG. 1 and includes a communications link CL having a plurality of remote process control units (remotes) R1 through R8 connected thereto. While, for purposes of illustration, only eight remotes are shown in FIG. 1, it is to be understood that the system is designed to be used with a much larger number of remotes. In the exemplary system shown, the remotes R1 through R3 and R5 through R7 are primary remotes and control an industrial process or system through input and output devices represented by $I/O_1$ through $I/O_3$ and $I/O_5$ through $I/O_7$, respectively. Each primary remote may control a large number of output devices and respond to a large number of input devices and the blocks labeled I/O in FIG. 1 each represents many input and output devices.

The remotes R4 and R8 in the exemplary embodiment are redundant remotes. The redundant remote R4 monitors the operation of primary remotes R1, R2 and R3 and redundant remote R8 monitors the operation of primary remotes R5, R6 and R7. Should any one of the remotes R1, R2 and R3 fail, the failure will be detected by the remote R4 in a manner to be described and the remote R4 will take over control of the input and output devices of the failed remote by receiving the data from the failed remote over the communications link CL and sending commands to the failed remote over the communications link CL in information blocks. Similarly, when one of the remotes R5, R6 or R7 fails, the redundant remote R8 will take over control of the operation of the input/output devices for the failed remote as described above with respect to redundant remote R4.

The communications link CL is shown as an open line, double channel configuration formed from dual coax, dual twisted pair, or the like with the individual communications links identified, respectively, by the reference characters $CL\phi$ and CL1. While the system configuration shown in FIG. 1 is a distributed open loop or shared global bus type, the invention is equally suitable for application to central systems or central/distributed hybrid configurations. The system of FIG. 1 is adapted for use in controlling an industrial process, e.g., the operation of a power generating plant and the input/output devices represented by the blocks labeled I/O may be various types of sensors (temperature, pressure, position, and motion sensors, etc.) and various types of controlled devices (motors, pumps, compressors, valves, solenoids, and relays, etc.).

Figure 2:
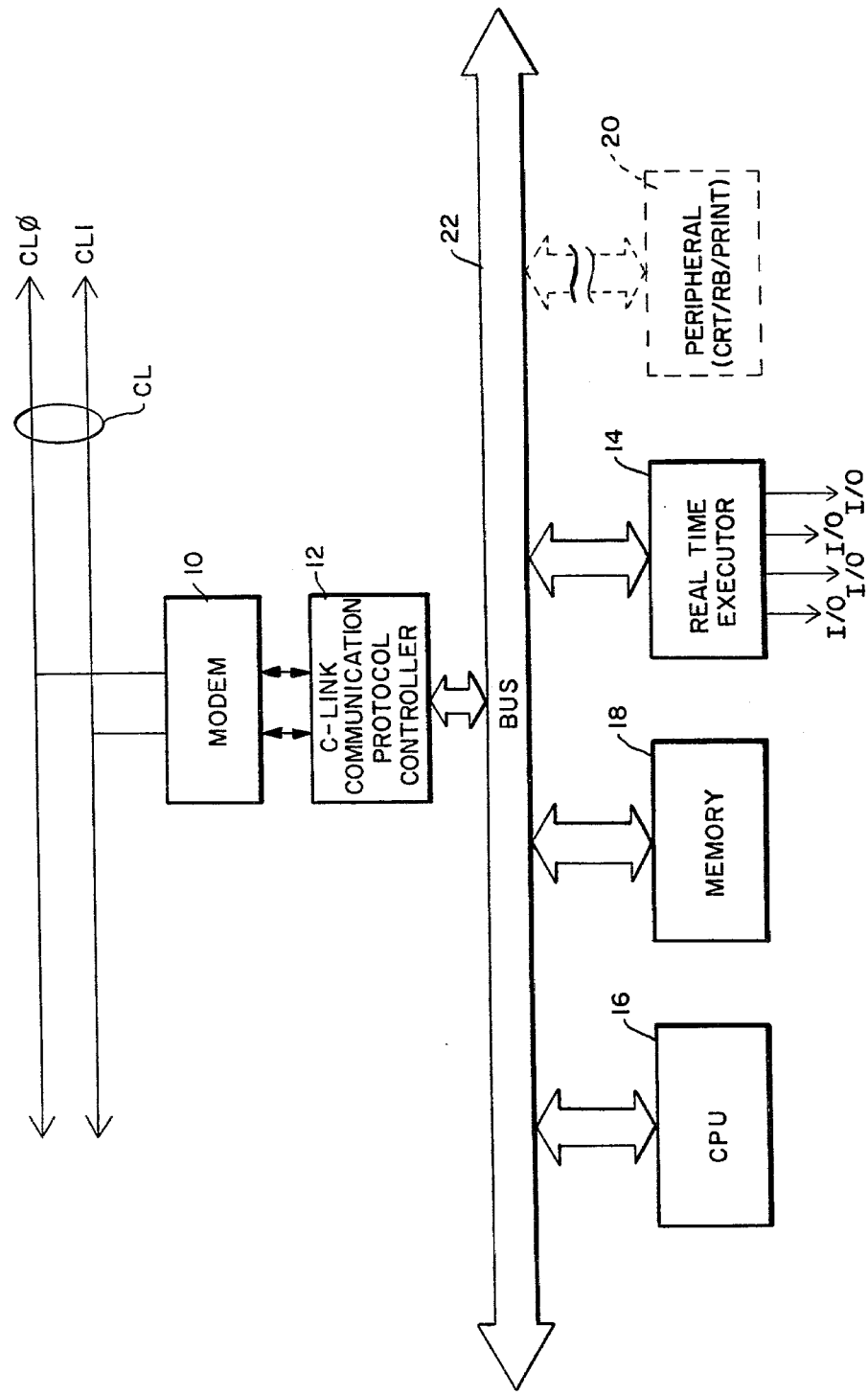
FIG. 2 is a schematic block diagram of an exemplary primary remote used in the system of FIG. 1.

The architecture of an exemplary primary remote $R_n$ is shown in FIG. 2. While the architecture of the remote $R_n$ can vary depending upon the control process requirements, the remote shown in FIG. 2 includes a modem 10; a communication protocol controller 12; a real time executor (RTX) 14; a central processing unit (CPU) 16; a memory 18; and a common bus 22 which provides addressing, control, and information transfer between the various devices which constitute the remote.

The communications protocol controller 12 and the modem 10 interface the remote with the communications link CL. The real time executor 14 interfaces the remote with the input/output devices assigned to the remote. The central processing unit 16 receives data from the real time executor 14 regarding the status of the input and output devices and also information and directions or commands from other remotes via the communications protocol controller 12. Using sequential logic, the CPU 16 processes the data and commands making use of the memory 18 and data stored therein and sends commands to the real time executor 14 to direct changes in the output devices controlled by the real time executor 14. The sequential logic program by which the CPU 16 responds to and controls the input and output devices connected to the real time exector is referred to as the applications program.

Some primary remotes involving simple control applications of the overall process controlled by the system may not have a CPU 16 or a memory 18, but could have only a communications protocol controller 12, a modem 10 and a real time executor 14. Remotes having a CPU 16 are referred to in this system as intelligent remotes whereas remotes which do not have a CPU 16 are referred to as smart remotes. In the exemplary embodiment illustrated in the drawings of this application, all of the primary remotes R1, R2, R3, R5, R6 and R7 are intelligent remotes.

One or more of the primary remotes may have peripheral equipment 20 interconnected with the common bus 22. The peripheral equipment may include a CRT display printer, or a keyboard. One of the remotes would contain the operation console to provide operator access to and control of the overall system and would necessarily have such peripheral equipment to provide such access and control.

Figure 3:
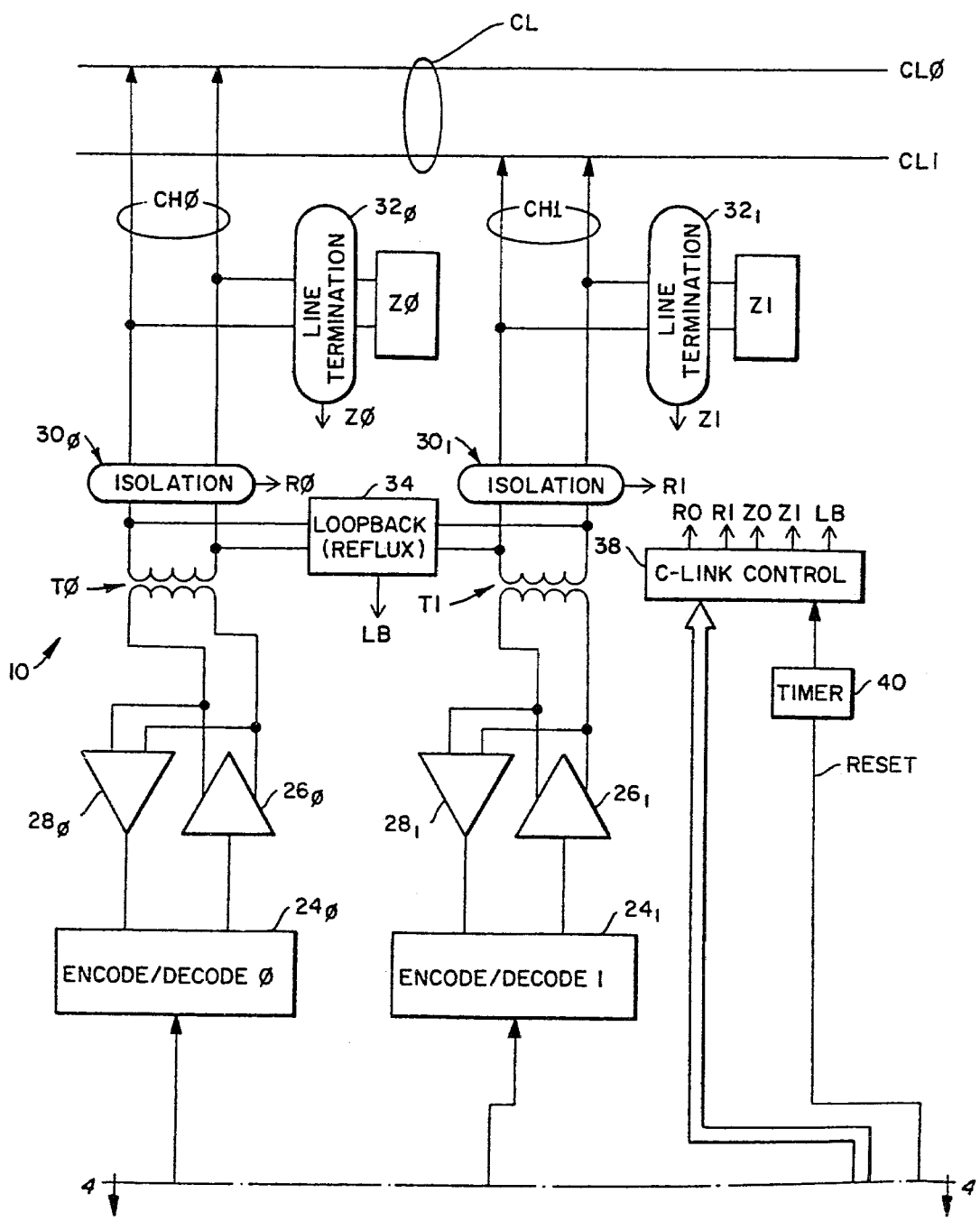
FIG. 3 is a schematic block diagram of an exemplary modulator/demodulator for the remote shown in FIG. 2.

As shown in more detail in FIG. 3, the modem 10 provides two independent communication channels $CH\phi$ and CH1 connected respectively to the communication links $CL\phi$ and CL1. Each of the communication channels $CH\phi$ and CH1 is provided with substantially identical communication devices, and a description of the communication devices of the first communication channel $CH\phi$ is sufficient to provide an understanding of the second communication channel CH1. The communication channel $CH\phi$ includes an encoder/decoder $24_\phi$ for providing appropriate modulation and demodulation of the digital data transmitted to and received from the communication link $CL\phi$. In the preferred form, the encoder/decoder $24_\phi$ converts digital information in non-return-to-zero binary (NRZ) format to base-band modulation (BBM) signal format for transmission and effects the converse for reception. Amplifiers $26_\phi$ and $28_\phi$ are provided, respectively, to drive a passive coupling transformer $T\phi$ with digital information provided from the encoder/decoder $24_\phi$ and provide amplified signals to the encoder/decoder $24_\phi$ from the coupling transformer $T\phi$. A set of selectively operably relay contacts $30_\phi$ are provided between the coupling transformer $T\phi$ and the corresponding communication link $CL\phi$ to effect selective interruption thereof to isolate the remote $R_n$ from the communications link CL, and another set of relay contacts $32_\phi$ are provided to selectively connect the signal output of the coupling transformer $T\phi$ with a termination impendance $Z\phi$. The termination impendance $Z\phi$ is used when the particular remote $R_n$ is at the end of the communication link CL to provide proper line termination impedance for the link. A selectively operable loop back circuit 34 is provided to permit looping back or re-circulation of test data during diagnostic checking of the remote $R_n$. The isolation relays $30_\phi$ and $30_1$, the impedance termination relays $32_\phi$ and $32_1$, and the loop back circuit 34 are connected to and selectively controlled by a C-link control device 38 which receives its communication and control signals from the communication protocol controller 12 described more fully below. A watch-dog timer 40 is provided to cause the C-link control device 38 to operate the isolation relays $30_\phi$ and $30_1$, to disconnect the remote $R_n$ from the communication link CL in the event the timer 40 times-out. The timer 40 is normally prevented from timing out by periodic reset signals provided from the communication protocol controller 12. In this way, a remote $R_n$ is automatically disconnected from the communication link CL in the event of a failure of the communication protocol controller 12.

Figure 4:
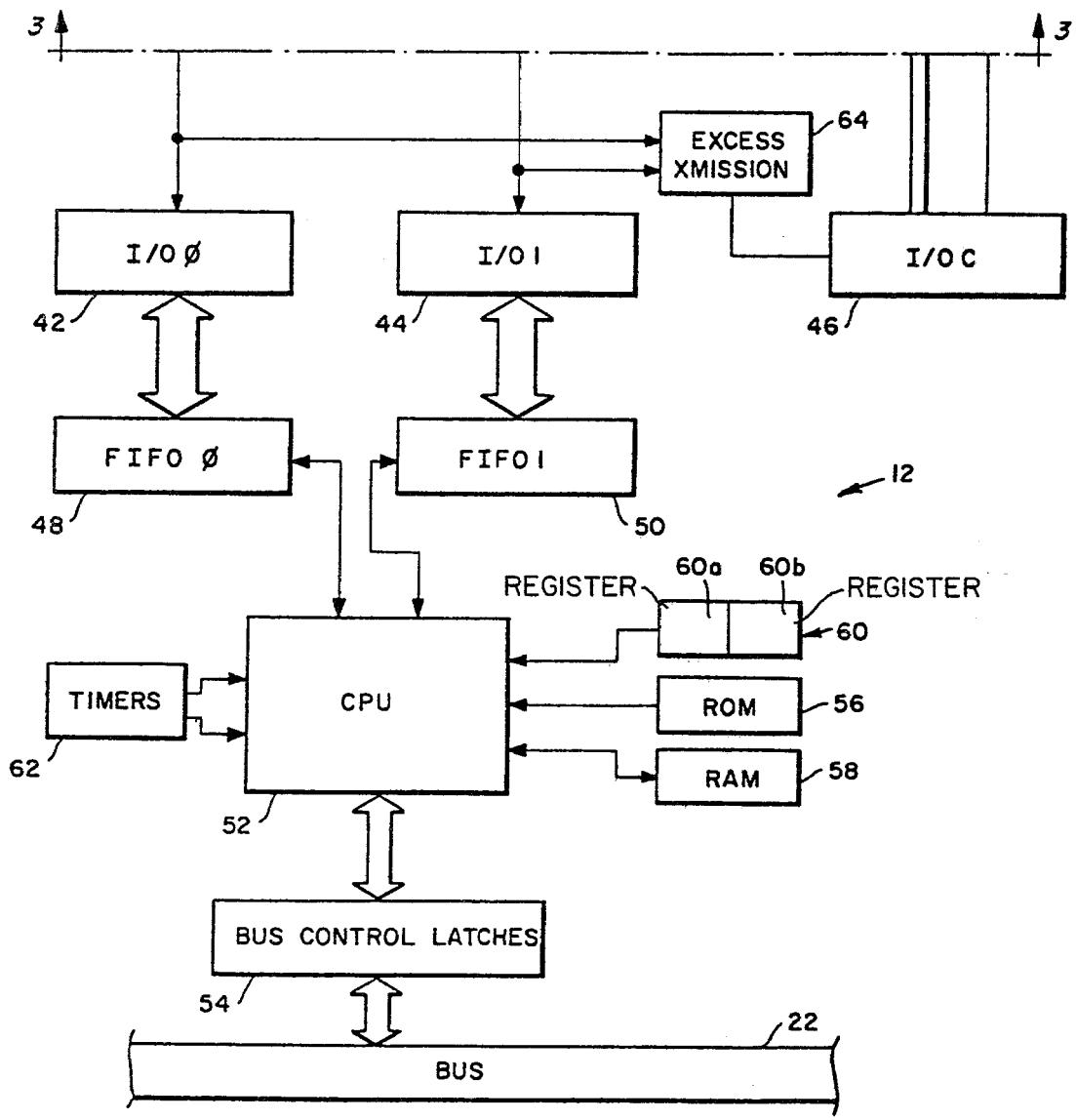
FIG. 4 is a schematic block diagram of an exemplary communication protocol controller for the remote shown in FIG. 2.

As shown in more detail in FIG. 4, each communication protocol controller 12 includes input/output ports 42, 44, and 46 which interface with the above described modem 10 for the communication channels CHφ and CH1 and the modem C-link control device 38 (FIG. 3). A first-in first-out (FIFO) serializer 48 and another first-in first-out serializer 50 are connected between the input/output ports 42 and 44 and a CPU signal processor 52. The first-in first-out serializers 48 and 50 function as temporary stores for storing information blocks provided to and from the modems 10. The CPU 52, in turn, interfaces with the bus 22 through bus control latches 54. A read only memory (ROM) 56 containing a resident firmware program for the CPU and a random access memory (RAM) 58 are provided to permit the CPU to effect its communication protocol function. A register 60 (for example, a manually operable DIP switch register or a hardwired jumper-type register) that includes registers 60a and 60b and timers 62 are also provided to assist the CPU in performing its communication protocol operation. An excess transmission detector 64, connected to input/output ports 42 and 44 (corresponding to communication channels CHφ and CH1) determines when the transmission period is in excess of a predetermined limit to cause the C-link control device 38 (FIG. 3) to disconnect the transmitting remote from the communications link CL and thereby prevent a remote that is trapped in a transmission mode from monopolizing the communications link CL.

The real time executor 14, a detailed description of which is not necessary to an understanding of the present invention, is preferably a firmware controlled 8×300 microprocessor-based device which is adapted to scan the various input/output hardware points, effect data collection and distribution to and from the input/output points, format the collected data in preferred formats, and assembly the data in selected sequences as well as place data in memory for subsequent transmission.

As mentioned above, the primary remotes are provided with active processing capability by interfacing a central processing unit 16 and corresponding memory 18 with the remote bus 22. For example, if the remote is monitoring and controlling a specific operating characteristic of a process step, such as a temperature or pressure variable, the microprocessor 16 with an appropriate firmware applications program compares the actual operating characteristic and a preferred set point, and effects one or more input/output actions in accordance with predetermined process control algorithms in the applications program.

In the preferred embodiment, the signal processor for the CPU signal processor in the communications protocol controller 12 is a 8×300 micro-controller manufactured by the Signetics Company of Sunnyvale, California, and the central processing unit 16 is an 86/12 single board 16-bit microcomputer manufactured by the Intel Company and adapted to and configured for the Intel MULTIBUS.

Figure 5:
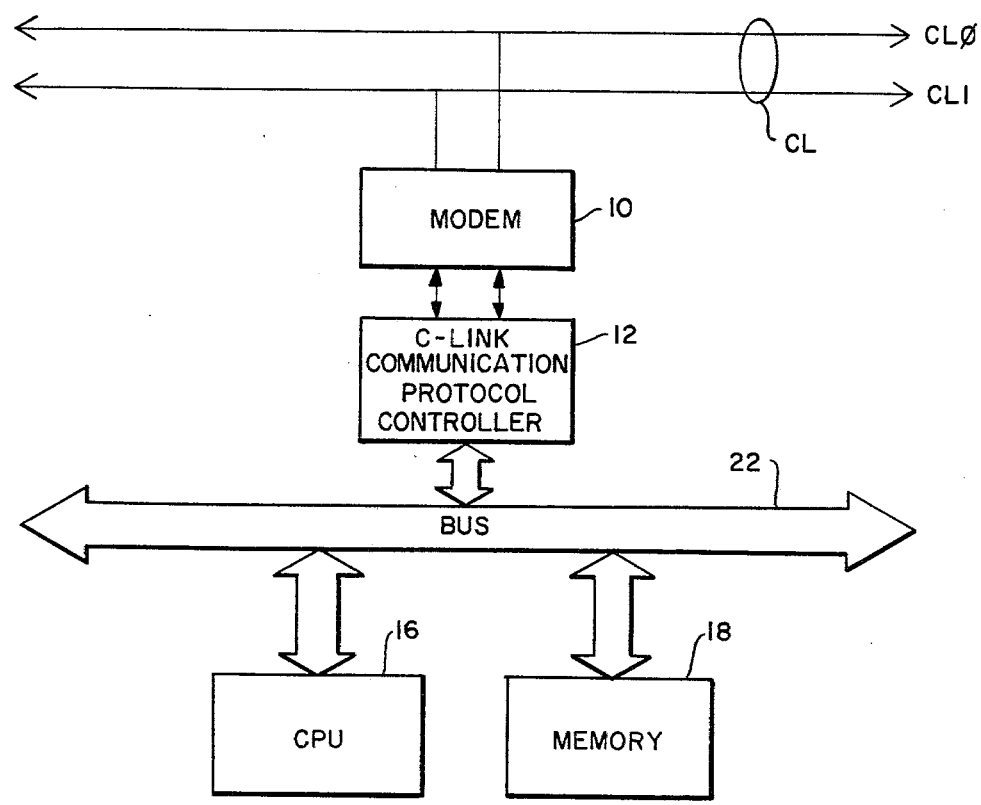
FIG. 5 is a schematic block diagram of an exemplary redundant remote used in the system of FIG. 1.

The architecture of a redundant remote, as shown in FIG. 5, is essentially the same as that of an intelligent primary remote except that it has no input/output devices assigned to it and it has no real time executor 14.

Figure 6:
FIG. 6 illustrates the format of an exemplary or illustrative information block for transferring information between remotes.

Each remote is adapted to communicate with the other by transmitting digital data organized in predetermined block formats. A suitable and illustrative block format 66 is shown in FIG. 6 and includes a multi-word header frame 66A, a multiword data frame 66B, and a block termination frame or word 66C. Selected of the uniform block configurations are adapted to transfer process control information to and from selected remote units $R_n$ and other of the block configurations are adapted to transfer supervisory control of the communications link CL from one remote to the other remote as explained in greater detail below.

Figure 6A:
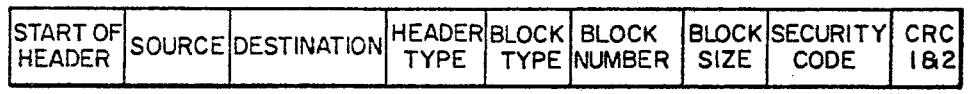
FIG. 6A illustrates the format of a header frame of the information block shown in FIG. 6.
Figure 6B:
FIG. 6B illustrates the format for a data/information frame of the information block shown in FIG. 6.
Figure 6C:
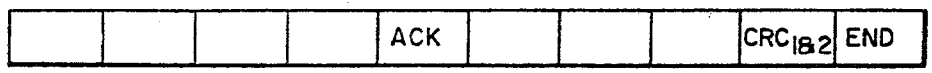
FIG. 6C illustrates the format for an acknowledgement block (ACK) for acknowledging successful receipt of an information block.
Figure 6D:
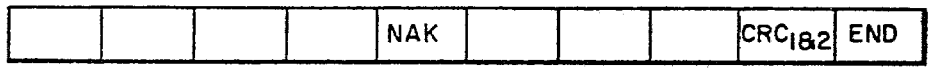
FIG. 6D illustrates the format for a non-acknowledgement block (NAK) for indicating the unsuccessful transmission of an information block between remotes.

An exemplary format for the header and data frames of an information block 66 is shown, respectively, in FIGS. 6A and 6B. The header frame 66A preferably includes a 'start of header' word(s) that indicates to all remotes that information is being transmitted; a 'source' identification word(s) that indicates identity of the source remote $R_s$ that is transferring the information; a 'destination' word(s) that indicates the identity of receiving or destination remote $R_d$; a 'header-type' word(s) that indicates whether the data block is transmitting data, a parametered command block, or a parameterless command block; 'block-type' word indicating the type of block (that is, a command block or a data block); a 'block number' word that indicates the number of blocks being sent; a 'block size' word indicating the length of the data frame; a 'security code' word(s) that permits alteration of the resident software programming in a remote; and, finally, a two-byte 'cyclic redundancy code' (CRC) validity word. The data frame for each data block, as shown in FIG. 5B, can include a plurality of data carrying bytes or words $B_1$, $B_2$, ... $B_n$ of variable length terminated with a two-byte cyclic redundancy code word. As described more fully below, each of the remotes is adapted to acknowledge (ACK) successful receipt of data and command blocks and nonacknowledge (NAK) the receipt of data in which a transmission error is detected. When transmitting an acknowledgement block or a non-acknowledgement block, the header format used is shown in FIGS. 6C and 6D in which an acknowledgement (ACK) or non-acknowledgement (NAK) word occupies the 'block type' word position. The block formats disclosed above are intended to be illustrative only and not limiting.

The various remote units R1 through R8 communicate with one another by having each remote successively take control of the communications link CL and then passing digital information between the controlling source remote $R_s$ and a destination remote $R_d$ using a double transmission alternate line technique that provides for high reliability data transfer between remotes.

When a remote unit assumes control of the communication link CL and, as a source remote $R_s$, desires to send data blocks to another, destination remote $R_d$, the data block is assembled at the source remote $R_s$ in accordance with the block formats discussed above in connection with FIGS. 6-6D and transmitted through the information channels CLφ and CL1 with the header frame containing both the source remote $R_s$ and the destination remote $R_d$ identification information.

Figure 7:
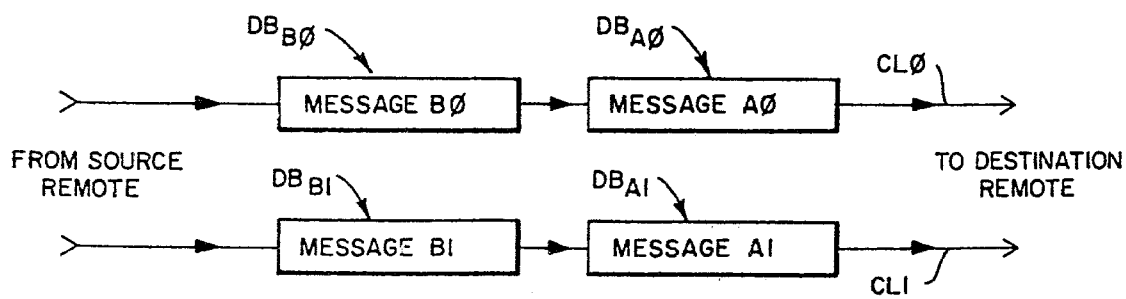
FIG. 7 illustrates, in pictorial form, two identical data blocks having the format shown in FIG. 6 successively transmitted on each communication channel of the communication link illustrated in FIG. 1.

In accordance with the data transmission technique, the communication protocol controller 12 of the source remote $R_s$ transmits the information blocks twice on each communication link CLφ and CL1 as schematically illustrated in FIG. 7 to provide a first data block $DB_A$ and then a second, following data block $DB_B$ on each communication link CLφ and CL1. The transmitted information block headers include the identity of the destination remote, $R_d$, which causes the destination remote $R_d$ to receive and act upon the information blocks. At the destination remote $R_d$, the two data blocks $DB_{Aφ}$ and $DB_{Bφ}$ on the communication link CLφ are passed through the communication channel CHφ and the two data blocks $DB_{A1}$ and $DB_{B1}$ on the communication link CL1 are passed through the communication channel CH1 to, respectively, the first-in first-out serializers 48 and 50 (FIG. 4).

The destination remote $R_d$ checks the validity of the received data by selecting one of the two communication links and then checks the first data block on the selected line (that is, $DB_{A\phi}$) by performing a cyclic redundancy check of the header frame and, if valid, performing a cyclic redundancy check of the data frame. If the data frame is valid, the communication protocol controller 12 of the destination remote $R_d$ then performs a bit-for-bit comparison between the CRC-valid first data block $DB_{A\phi}$ and the second data block $DB_{A\phi}$. If the bit-for-bit comparison is good, an acknowledgement (ACK) signal is sent from the destination remote $R_d$ to the source remote $R_s$ to indicate the receipt of valid information to complete that data block information transaction. On the other hand, if the CRC validity checks of the header or the data frame or the bit-for-bit comparison check indicate invalid data, the protocol controller 12 of the destination remote $R_d$ then selects the other, alternate line (in this case, CL1) performs the aforementioned cyclic redundancy checks of the header and data frame and the bit-for-bit comparison between the first and second data blocks $DB_{A1}$ and $DB_{B1}$ on the alternate line CL1. If these checks indicate valid data on the alternate line, the destination remote responds with an acknowledgement signal to conclude the data block transmission transaction. On the other hand, if these checks indicate invalid data on the alternate line (which means that the data blocks on both the first-selected line and the alternate line are invalid) the destination remote $R_d$ responds with a non-acknowledgement signal (NAK) to cause retransmission of the data blocks from the source remote $R_s$. The non-acknowledgement (NAK) includes a byte or bytes indicating the identity of the data block or blocks which should be retransmitted. A counter (not shown) is provided that counts the number of retransmissions from the source remote $R_s$ and, after a finite number of retransmissions (e.g. four), halts further retransmission to assure that a source remote $R_s$ and a destination remote $R_d$ do not become lost in a repetitive transmit/NAK/retransmit/NAK . . . sequence in the event of a hardware or software failure of the destination remote $R_d$ error checking mechanism.

The double message alternate line checking sequence summarized above is described in more detail in the above mentioned copending application Ser. No. 115,161.

As mentioned above, each remote of the control system is adapted to accept and then relinquish supervisory control of the communication link CL on a master for the moment or revolving master arrangement. The communication protocol controller 12 of each remote includes a register which contains the remote succession number and another register which contains the total number of remotes in the system. The system is provided with initialization software so that the first remote in the succession R1 assumes supervisory control of the communications link CL after system start-up and becomes the initial master of the system. When the initial master R1 is in control of the communications link CL, it can send data to any of the other remotes, request status or other data from another remote, and send control blocks and the like over the communications link. When the master R1 determines that it no longer desires possession of the communications link CL, it passes supervisory control of the communications link CL, to the next or first successive remote in accordance with the succession order. Thus, when the present master R1 concludes its information transfer transactions, it transfers supervisory control of the communications link CL to its next or first successive remote R2 by transmitting a control block to the remote R2 with all the remaining remotes being congnizant of the transfer of supervisory control from the present master R1 to its first or next successive remote R2.

After the initial system master R1 transfers supervisory control of the communications link CL to remote R2, remote R2 then becomes the present master. When the present master R2 concludes its information transfer transactions, if any, it transfers supervisory control to remote R3 by sending an appropriate control block to remote R3 which responds with an acknowledgement signal (ACK) or, in the event of a mistransmission of the control block, a non-acknowledgement signal (NAK) which causes retransmission of the control block. This transfer sequence continues in succession with supervisory control of the communication link CL being passed from remote to remote in succession with the last remote R8 returning supervisory control to the first remote R1.

In the memory 18 of each intelligent remote, a memory location is assigned the task of being the mailbox register for the intelligent remote. Each time the central processing unit 16 of the intelligent remote cycles through its applications program, in which it responds to and controls the input/output devices of the remote via the real time executor 14, it stores a predetermined number in this mailbox. Each time the microprocessor of the real time executor 14 cycles through its program, it decrements the number stored in the mailbox. The time for the CPU 16 to cycle through its program and for the real time executor 14 to cycle through its program is approximately 1:1 so that the number stored in the mailbox will be maintained at or near the predetermined value set in by the applications program of the CPU 16 unless the CPU 16 ceases to cycle through its applications program. Should this happen, the number stored in the mailbox memory 18 will be decremented until it reaches a zero value.

Each time the redundant remote which is serving as the back-up for the intelligent remote takes its turn in the master-for-the-moment sequence, the redundant remote will request and obtain the value of the number in the mailbox. If the number in the mailbox is not zero, the redundant remote will know that the central processing unit 16 in the primary remote is carrying out its applications program and has not gone into an emergency mode of operation or ceased to operate. If the redundant remote detects that the number of the mailbox is zero, then the redundant remote will determine that the central processing unit 16 is not carrying out the applications program and in response to this determination, the redundant remote will first attempt to restart the applications program in the central processing unit 16 of the primary remote. If it fails to successfully restart the applications program in the central processing unit, the redundant remote will carry out the applications program for the failed remote. In carrying out the applications program, the redundant remote will respond to the input devices and control the output devices assigned to the failed primary remote by sending commands and receiving data from the failed remote over the communications link.

The redundant remote, in addition to checking the status of the primary remotes for which the redundant remote serves as a back-up, also must maintain an up-to-date record of the status of the applications programs in each of these primary remotes. The redundant remote checks the status of the mailbox and gets the current application program status from each of the primary remotes by sending requests for information over the communications link when the redundant remote takes its turn in the master-for-the-moment sequence described above.

Figure 8A:
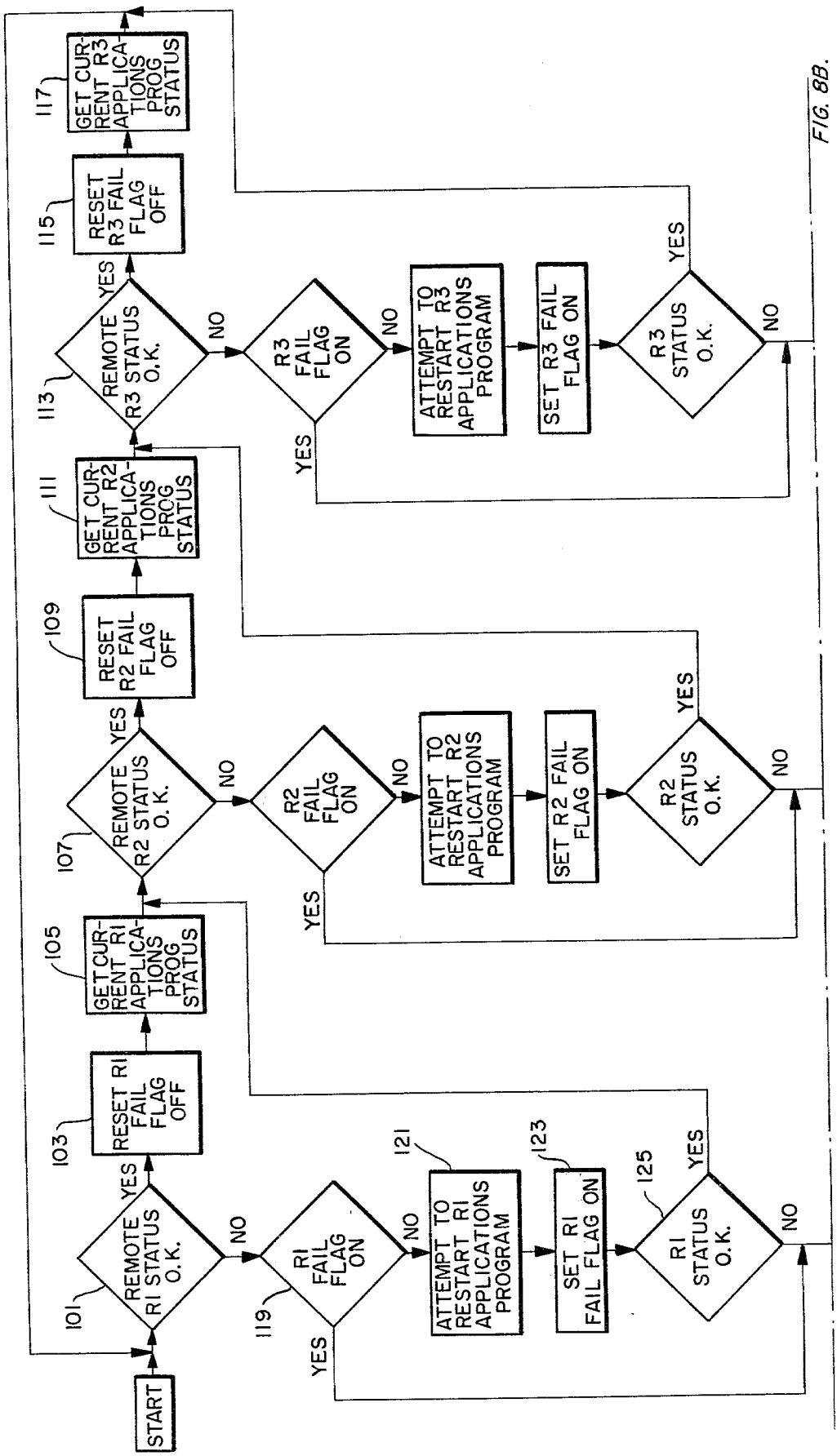

The operation of the redundant remote in carrying out its function in serving as a back-up for the primary remotes will be more fully understood with reference to FIGS. 8A and 8B, which illustrate a flow chart of the program in the redundant remote R4, which serves as a back-up for primary intelligent remotes R1, R2, and R3. The redundant remote R8 will have the same program except that it will be applied to remotes R5, R6 and R7.

As shown in FIGS. 8A and 8B, after the program in the redundant remote is started, it enters into a decision instruction sequence 101 to check the status of remote R1. As explained above, it does this by sending a request for information over the communications link to remote R1 asking for the current number in the mailbox of remote R1. It then determines whether this number is greater than zero. If the number is greater than zero, the status of remote R1 is determined to be operating and the program of the redundant remote advances to instruction step 103 in which it resets a fail flag for R1 to off and then enters subroutine 105, in which the current applications program status in remote R1 is obtained. This means that the redundant remote R4 requests and obtains the current status of the input and output devices in remote R1 and the current status of the timers and the counters and the flags being used in the applications program of remote R1. In other words, in subroutine 105, all of the information that would be needed for the redundant remote to take over the applications program is obtained from remote R1. This information is obtained by sending requests for data and receiving data back over the communications link.

Following the obtaining of the current applications program status of remote R1, the redundant remote program proceeds to decision instruction sequence 107, in which the status of remote R2 is checked in the same manner that was done with respect to R1. If the status of remote R2 is operating, the program advances to instruction step 109, in which the program sets a fail flag for remote R2 and then proceeds into subroutine 111, in which the status of the applications program for remote R2 is obtained in the same manner as for R1 in subroutine 105. The program then proceeds into a decision instruction sequence 113 to check the status of remote R3. If the status of remote R3 is operating, then the program resets the fail flag for remote R3 in instruction step 115 and proceeds into subroutine 117 to obtain the applications program status for remote R3 in the same manner as for R1 in subroutine 105. Following subroutine 111, the program returns again to decision instruction sequence 101 to check the status of remote R1 and the process cyclically repeats.

If in decision instruction sequence 101, the program determines that the status R1 is not operating as indicated by the number in the mailbox of the remote, R1 being zero, the program then advances to decision instruction sequence 119, in which the program determines if the fail flag for R1 is on or off. If the fail flag is off, the program proceeds into instruction sequence 121, in which the program attempts to restart the applications program for remote R1. It does this by sending a command over the communications link to remote R1 to direct the communications protocol controller to attempt a hardware restart of the applications program. This is carried out by the communications program controller pulling a restart wire in the common bus 22 to ground. When this restart wire is pulled to ground, it starts the applications program back through its initialization program and sets all of the flags, timers, and counters just as if power had just been turned on. Such a restart is called a hardware restart. Alternatively, the redundant remote could effect a software restart in the failed remote. A software restart would merely start the applications program through its initialization program with the timers, counters and flags left in their present status.

After completing instruction sequence 121, the redundant remote program then sets the fail flag for remote R1 to on in instruction step 123 and then proceeds into decision instruction sequence 125 to again check the status of remote R1 by checking the number in the mailbox of remote R1 in the same manner as in decision instruction sequence 101. If the applications program in remote R1 was successfully started in instruction sequence 121, the number in the mailbox will not be zero and the program will determine that the status of remote R1 is operating, whereupon the program will jump to decision instruction sequence 107 to check the status of remote R2 as already described.

If the program determines that the status of remote R1 is not operating in decision instruction sequence 125, then this means that the attempt to restart the applications program in remote R1 in instruction sequence 121 failed and the redundant remote program then proceeds into instruction sequence 127 to initialize the real time executor in remote R1 to receive instructions and data from the redundant remote R4 instead of from the central processing unit 16 in the remote R1 and to send data on the status of the input and output devices to the redundant remote R4.

If the program of the redundant remote determines that the fail flag was on instead of off in decision instruction sequence 119, the redundant remote program would proceed directly into the instruction sequence 127 to initialize the real time executor of remote R1 to respond to the redundant remote R4.

The purpose of the fail flag which is set to on in instruction step 123 and is reset to off in instruction step 103 is to prevent the redundant remote program from getting hung up in a condition in which it successfully restarts the remote R1 only to have the remote R1 fail again by the time the program of the redundant remote recycles around to checking the mailbox of the remote R1 again in decision instruction sequence 101. If this should happen, the fail flag for remote R1 will have been set to on in instruction step 123 after the successful restarting of the applications program. Then, the next time that the redundant remote program cycles back to decision instruction sequence 101, and determines that the status of remote R1 is not operating, the fail flag for remote R1 will be on. Accordingly, the program will jump from decision instruction sequence 119 into the instruction sequence 127 to initialize the remote R1 to respond to redundant remote R4. If the next time the redundant remote program recycles back to decision instruction sequence 101 to check the status of R1, it determines that the status of R1 is operating, the program will then reset the fail flag to off in instruction step 103 so that in subsequent cycles, should the program determine that the remote R1 has again failed, the program will again go into the restart instruction sequence 121 instead of immediately jumping to the initialization instruction sequence 127.

After the redundant remote program has completed the initialization instruction sequence 127, it then proceeds to subroutine 129. In this subroutine, the status of the applications program of remote R1 last received by the redundant remote R4, which status is stored in the memory of the redundant remote R4, is loaded into predetermined registers of the memory of the redundant remote in order to carry out the applications program of remote R1 in the redundant remote R4. After this subroutine is completed, the program proceeds into instruction sequence 130 and then into the subroutine 131 in which it starts and carries out the applications program. The redundant remote R4 carries out the R1 applications program by receiving data from remote R1 as to the status of the input and output devices of the remote R1 and sending instructions to remote R1 to direct operation of the real time executor of the remote R1. The program in the redundant remote will then continue to cycle through the applications program for the remote R1 until it receives a command from the operator to reset it back into its main cycle of checking the status of the remotes R1, R2, and R3.

Should the redundant remote R4 determine that the status of remote R2 or remote R3 is not operating, it then performs the same program with respect to these remotes as described with respect to remote R1 as is illustrated in FIGS. 8A and 8B.

The redundant remote R8 checks the status of remotes R5, R6, and R7 in the same manner as described above for remotes R1–R4. Similarly, the redundant remote R8 will take over the applications program should any of the primary remotes R5–R7 become non-operating in the same manner as described above with respect to R4 serving as a back-up for the primary remotes R1–R3.

It will be appreciated that the provision of the redundant remotes in accordance with the invention decreases malfunctioning of the control system due to one of the primary remotes becoming inoperative as a result of failure of the central processing unit of the primary remote. Because each redundant remote serves as a back-up for several primary remotes, the cost of providing the redundancy is significantly reduced. Because the redundant remotes are themselves each a remote control unit which takes its turn in the master-for-a-moment sequence communicating with the other remotes over the two-wire communications link, the redundant remotes can be provided in the system very cheaply and inexpensively. Thus, the present invention provides for high reliability of the control system with a minimum of expense.

The above described system is a preferred embodiment of the invention and many modifications may be made thereto without departing from the spirit and scope of the invention which is defined in the appended claims.

We claim:

1. A distributed process control system comprising a plurality of primary control units interconnected by a communications link, each of said primary control units having a central processing unit and a plurality of input/output devices connected thereto, said input/output devices sensing the condition of and controlling the operation of a process, the central processing unit of each of said primary control units containing a stored applications program which responds to the condition of input devices connected thereto and controlling the output devices connected thereto in accordance with said applications program, each of said primary control units being operable to receive data from and transmit data to each of the other primary control units over said communications link, at least one redundant control unit connected to said communications link and operable to receive data from and transmit data to each of said primary control units connected to said communications link, said redundant control unit comprising a central processing unit with a stored program and comprising means to monitor said primary control units and to respond to the central processing unit of one of said primary control units failing to carry out its stored applications program, to carry out such applications program in the central processing unit of the redundant control unit, said redundant control unit receiving data from said one of said primary control units representing the condition of the input and output devices of the primary control unit over said communications link and sending instructions to said one of said primary control units to direct changes in the output devices of the primary control unit in accordance with such applications program being carried out in said redundant control unit, each primary control unit including means to respond to instructions received from said redundant control unit over said communications link directing changes in the output devices of such primary control unit to effect corresponding changes in the output devices of such primary control unit.

2. A distributed process control system as recited in claim 1, wherein said system includes a plurality of redundant control units each serving as a back-up for a different set of primary control units, each of said redundant control units being operable to receive data from and transmit data to each of said primary control units and each of said other redundant control units over said communications, link, each of said redundant control units comprising a central processing unit with a stored program and comprising means to monitor the primary control units for which said redundant control unit serves as a back-up and operating in response to the central processing unit of one of said primary control units for which such redundant control unit serves as a back-up failing to carry out its stored applications program, to carry out such applications program in the central processing unit of such redundant control unit.

3. A distributed process control system as recited in claim 1, wherein said primary control units and said redundant control units include means to cause said control units to take turns being master of said communications link with each of said control units being operable when master of said communications link to receive and transmit data to any other of said control units and being operable when not master of said communications link to only receive and transmit data over said communications link in response to instructions from the control unit that is master of said communications link.

4. A distributed process control system as recited in claim 1, wherein said communications link comprises means to transmit data between said control units in serial binary form.

5. A distributed process control system as recited in claim 1, wherein said communications link is operable to transmit data between said control units in the form of data blocks, each of said control units including means operable in response to receiving an information data block from a sending control unit over said communications link to transmit an acknowledgement data block over said communications link to said sending control unit to indicate receipt by the receiving control unit of said information data block.

6. A distributed process control system as recited in claim 3, wherein the control unit that is master of said communications link ends its turn out of being master by transmitting a predetermined control block over said communications link to the control unit which has the next turn of being master of the communications link, the control unit that has the next turn of being master becoming master of said communications link in response to receiving said control block.

7. A distributed process control system as recited in claim 1, wherein said input/output devices are connected to said primary control units over channels which are separate from said communications link.

* * * * *